(12) United States Patent
Ban et al.

(10) Patent No.: US 6,985,592 B1
(45) Date of Patent: Jan. 10, 2006

(54) MULTIPURPOSE EARPHONE SET

(75) Inventors: Satoshi Ban, Osaka (JP); Kiyoshi Hotta, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/003,812

(22) Filed: Jan. 7, 1998

(30) Foreign Application Priority Data

Jan. 8, 1997 (JP) ............................. 9-001600

(51) Int. Cl.
H04R 1/10 (2006.01)
H04B 5/00 (2006.01)
H02B 1/00 (2006.01)
H04M 3/00 (2006.01)
H04M 1/00 (2006.01)

(52) U.S. Cl. ........................ 381/74; 381/79; 381/123; 455/557; 455/568; 379/308

(58) Field of Classification Search ................ 381/309, 381/311, 315, 72, 74, 79, 123, 94.1, 94.5; 455/575, 550, 553, 556, 557, 568, 345
See application file for complete search history.

(56) References Cited

U.S. PATENT DOCUMENTS

| 4,621,372 A | * 11/1986 | Relyea ........................ 381/309 |
| 4,829,571 A | * 5/1989 | Kakiuchi et al. ............. 381/74 |
| 4,864,619 A | * 9/1989 | Spates ........................ 381/309 |
| 4,873,712 A | * 10/1989 | Porco ........................ 455/572 |
| 4,888,810 A | * 12/1989 | Preves ........................ 381/109 |
| 4,941,187 A | * 7/1990 | Slater ........................ 381/86 |
| 4,960,018 A | 10/1990 | Towsend |
| 5,010,577 A | * 4/1991 | Sakanishi et al. ........... 381/109 |
| 5,694,467 A | * 12/1997 | Young, III .................. 379/430 |
| 5,794,127 A | * 8/1998 | Lansang ....................... 455/66 |
| 5,867,794 A | * 2/1999 | Hayes et al. ................. 455/557 |
| 5,978,689 A | * 11/1999 | Tuoriniemi et al. ......... 455/569 |
| 5,991,637 A | * 11/1999 | Mack, II et al. ............ 455/575 |
| 6,002,944 A | * 12/1999 | Beyda ........................ 455/554 |
| 6,091,812 A | * 7/2000 | Iglehart et al. ............. 379/308 |
| 6,519,475 B1 | * 2/2003 | Kim ........................ 455/557 |

FOREIGN PATENT DOCUMENTS

| JP | 05091016 | 4/1993 |
| JP | 07222241 | 8/1995 |
| JP | 08195997 | 7/1996 |

* cited by examiner

Primary Examiner—Xu Mei
Assistant Examiner—Laura A. Grier
(74) Attorney, Agent, or Firm—Clark & Brody

(57) ABSTRACT

An earphone apparatus is designed for an audio device and a portable communication terminal device. The earphone apparatus includes a first plug for disconnectable connection with the audio device, and a second plug for disconnectable connection with the portable communication terminal device. An electroacoustical transducer connected to the first plug and the second plug is operative for converting a first electric signal transmitted via the first plug into corresponding sound, and for converting a second electric signal transmitted via the second plug into corresponding sound. A suitable controller provided between the first plug and the electroacoustical transducer is operative for controlling a level of the first electric signal transmitted to the electroacoustical transducer.

3 Claims, 6 Drawing Sheets

MULTIPURPOSE EARPHONE SET

BACKGROUND OF THE INVENTION

1. Field of the Invention

This invention relates to an earphone, earphones, or an earphone set for an electric device or devices.

2. Description of the Related Art

There are earphones for audio devices such as CD (compact disc) players, cassette tape players, or radio receivers. There are earphone-microphone combinations for portable communication terminal devices such as portable telephone devices or portable radio communication devices.

When one wears earphones for an audio device, one can not effectively hear sounds from an earphone-microphone combination for a portable communication terminal device. Similarly, when one wears an earphone-microphone combination for a portable communication terminal device, one can not effectively hear sounds from earphones for an audio device.

SUMMARY OF THE INVENTION

It is an object of this invention to provide an improved earphone, improved earphones, or an improved earphone set.

A first aspect of this invention provides an earphone apparatus for an audio device and a portable communication terminal device, comprising a first plug for disconnectable connection with the audio device; a second plug for disconnectable connection with the portable communication terminal device; an electroacoustical transducer connected to the first plug and the second plug for converting a first electric signal transmitted via the first plug into corresponding sound, and for converting a second electric signal transmitted via the second plug into corresponding sound; and means provided between the first plug and the electroacoustical transducer for controlling a level of the first electric signal transmitted to the electroacoustical transducer.

A second aspect of this invention provides an earphone apparatus for an audio device and a portable communication terminal device, comprising a first plug for disconnectable connection with the audio device; a second plug for disconnectable connection with the portable communication terminal device; an electroacoustical transducer; first means connected to the second plug for detecting whether or not a call-related electric signal is outputted from the portable communication terminal device; and second means connected to the first plug, the second plug, the electroacoustical transducer, and the first means for disconnecting the first plug from the electroacoustical transducer and connecting the second plug to the electroacoustical transducer when the first means detects that a call-related electric signal is outputted from the portable communication terminal device.

A third aspect of this invention is based on the second aspect thereof, and provides an earphone apparatus further comprising third means connected to the second plug for detecting a level of an electric speech signal outputted from the portable communication terminal device; fourth means connected to the first plug, the second plug, the electroacoustical transducer, and the third means for disconnecting the first plug from the electroacoustical transducer and connecting the second plug to the electroacoustical transducer when the level detected by the third means is equal to or higher than a predetermined reference level; fifth means connected to the first plug, the second plug, the electroacoustical transducer, and the third means for disconnecting the second plug from the electroacoustical transducer and connecting the first plug to the electroacoustical transducer in cases where the level detected by the third means drops below the predetermined reference level and then remains lower than the predetermined reference level during longer than a predetermined time length; and sixth means connected to the first plug, the second plug, the electroacoustical transducer, and the third means for holding the first plug disconnected from the electroacoustical transducer and holding the second plug connected to the electroacoustical transducer in cases where the level detected by the third means drops below the predetermined reference level and then remains lower than the predetermined reference level during the predetermined time length or shorter.

A fourth aspect of this invention is based on the first aspect thereof, and provides an earphone apparatus further comprising a microphone element connected to the second plug, and a switch connected to the second plug for generating a control signal transmitted to the portable communication terminal device.

A fifth aspect of this invention is based on the second aspect thereof, and provides an earphone apparatus further comprising a microphone element connected to the second plug, and a switch connected to the second plug for generating a control signal transmitted to the portable communication terminal device.

A sixth aspect of this invention provides an earphone apparatus for an audio device and a portable communication terminal device, comprising a first plug for disconnectable connection with the audio device; a second plug for disconnectable connection with the portable communication terminal device; an electroacoustical transducer connected to the first plug and the second plug for converting a first electric signal transmitted via the first plug into corresponding sound, and for converting a second electric signal transmitted via the second plug into corresponding sound; and means provided among the first plug, the second plug, and the electroacoustical transducer for increasing one of levels of the first electric signal and the second electric signal transmitted to the electroacoustical transducer while decreasing the other level.

DESCRIPTION OF THE PREFERRED EMBODIMENTS

First Embodiment

Figure 1:
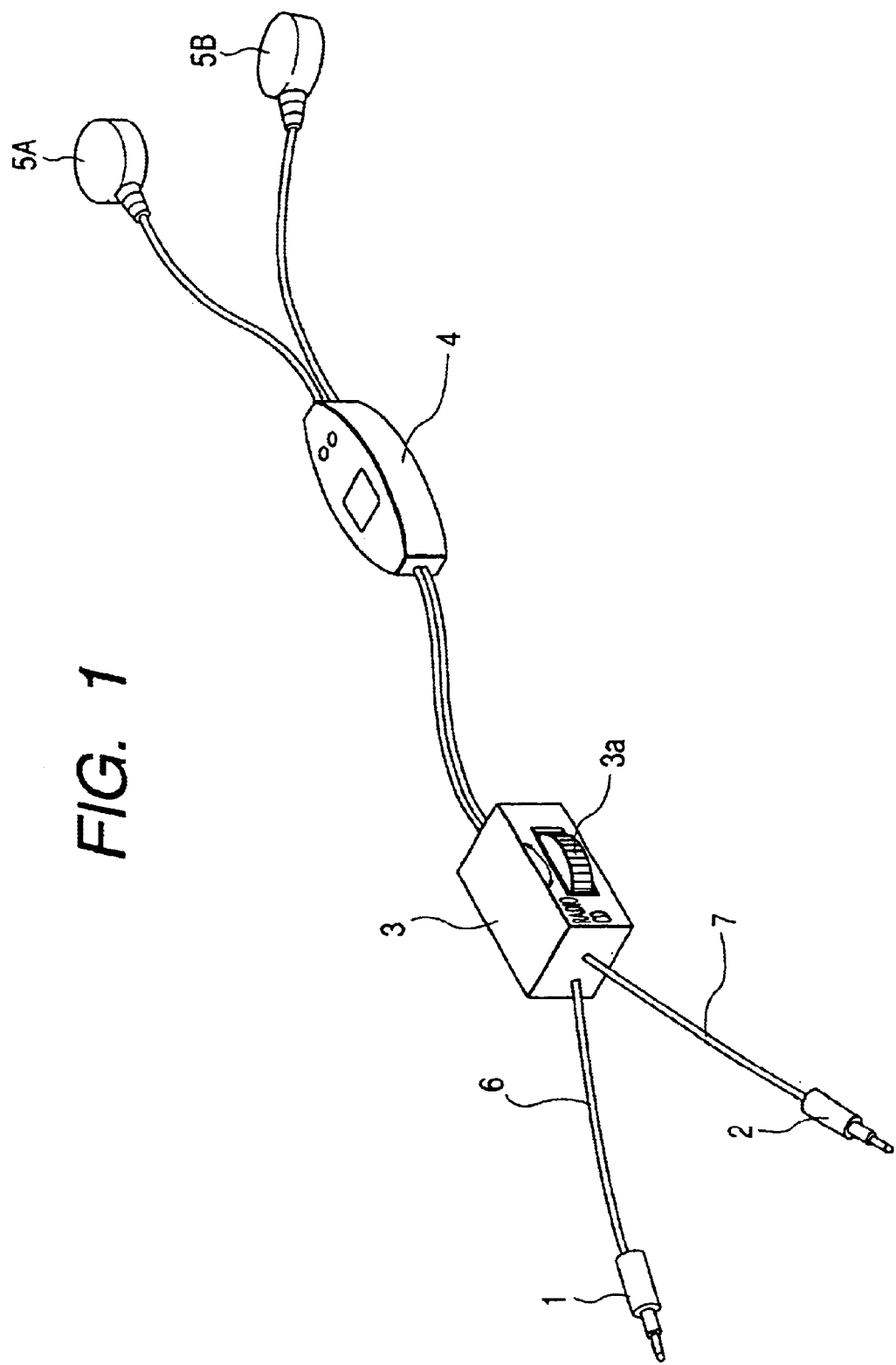
FIG. 1 is a perspective view of an earphone-microphone set according to a first embodiment of this invention.

With reference to FIG. 1. an earphone-microphone set includes a plug 1 for disconnectable connection with a stereophonic audio device (not shown) and a plug 2 for disconnectable connection with a portable communication terminal device (not shown). Examples of the audio device are CD (compact disc) players, cassette tape players, and radio receivers. Examples of the portable communication terminal device are portable telephone devices and portable radio communication devices. The stereophonic audio device may be replaced by a monophonic audio device.

The earphone-microphone set also includes a change box 3, a microphone unit 4, and a pair of a left-hand loudspeaker 5A and a right-hand loudspeaker 5B. The plug 1 is connected to the change box 3 via a cable 6. The plug 2 is connected to the change box 3 via a cable 7. The change box 3 is connected to the microphone unit 4 via a cable (no reference numeral). The left-hand loudspeaker 5A is connected to the microphone unit 4 via a cable (no reference numeral). The right-hand loudspeaker 5B is connected to the microphone unit 4 via a cable (no reference numeral).

The change box 3 includes manually-operated volume adjusters or manually-operated variable resistors for controlling the level of an audio signal transmitted from the audio device and the level of an audio signal transmitted from the portable communication terminal device. The change box 3 is provided with a rotatable dial 3A for operating the volume adjusters. The change box 3 also has the function of changing the balance or the ratio between the level of the audio signal from the audio device and the level of the audio signal from the portable communication terminal device.

The microphone unit 4 includes a microphone element and a manually-operated switch. When speech communication is implemented by using the portable communication terminal device and the earphone-microphone set, the microphone element in the microphone unit 4 converts voice into a corresponding audio signal which is transmitted to the portable communication terminal device. The switch in the microphone unit 4 generates an electric control signal when being operated. The electric control signal is transmitted to the portable communication terminal device, being used therein to implement a call or a terminating call (a terminating connection).

The left-hand loudspeakers 5A and the right-hand loudspeakers 5B are used as earphone elements. The left-hand loudspeaker 5A and the right-hand loudspeaker 5B include electroacoustical transducers respectively. Normally, the left-hand loudspeaker 5A is placed in user's left-hand ear while the right-hand loudspeaker 5B is placed in user's right-hand ear. The left-hand loudspeaker 5A and the right-hand loudspeaker 5B receive the audio signals from the audio device and the portable communication terminal device. The left-hand loudspeaker 5A and the right-hand loudspeaker 5B convert the received audio signals into corresponding sounds.

Figure 2:
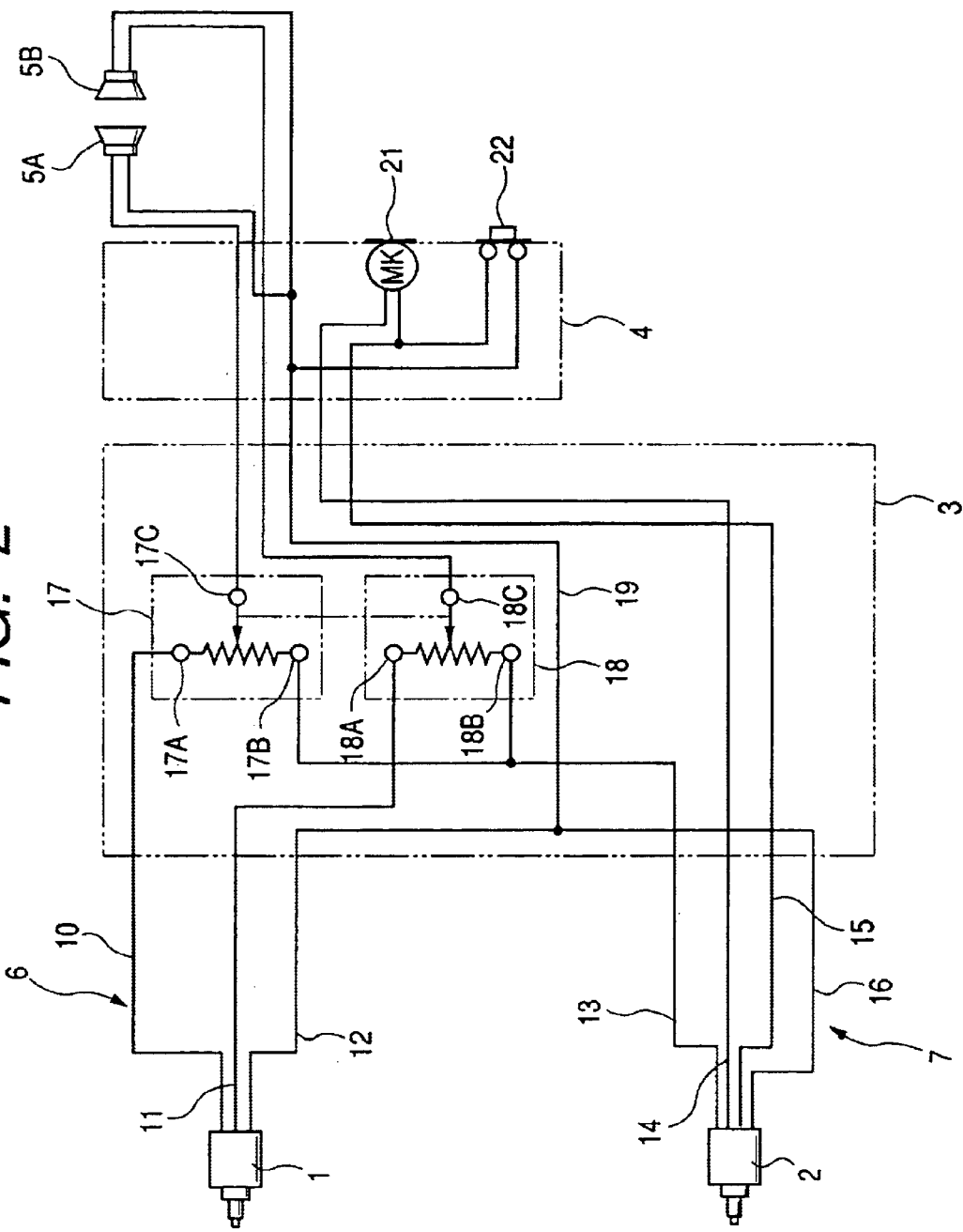
FIG. 2 is a schematic diagram of the earphone-microphone set in FIG. 1.

As shown in FIG. 2. the cable 6 includes a left-channel line 10, a right-channel line 11, and a ground line 12 extending between the plug 1 and the change box 3. The cable 7 includes a reception signal line 13, a transmission signal line 14, a switch line 15, and a ground line 16 extending between the plug 2 and the change box 3.

The change box 3 includes volume adjusters or variable resistors 17 and 18 which are ganged. The volume adjusters 17 and 18 are operated together in accordance with rotation of the dial 3A (see FIG. 1).

The volume adjuster 17 has a first end 17A, a second end 17B, and a control terminal 17C. For example, a fixed resistor is connected between the first end 17A and the second end 17B. The control terminal 17C connects with the fixed resistor at a point which can be moved between the ends of the fixed resistor. The first end 17A of the volume adjuster 17 is connected to the left-channel line 10. The second end 17B of the volume adjuster 17 is connected to the reception signal line 13. The control terminal 17C of the volume adjuster 17 is connected to a first terminal of the left-hand loudspeaker 5A via a line extending through the microphone unit 4.

The volume adjuster 18 has a first end 18A, a second end 18B, and a control terminal 18C. For example, a fixed resistor is connected between the first end 18A and the second end 18B. The control terminal 18C connects with the fixed resistor at a point which can be moved between the ends of the fixed resistor. The first end 18A of the volume adjuster 18 is connected to the right-channel line 11. The second end 18B of the volume adjuster 18 is connected to the reception signal line 13. The control terminal 18C of the volume adjuster 18 is connected to a first terminal of the right-hand loudspeaker 5B via a line extending through the microphone unit 4.

In the change box 3, the ground lines 12 and 16 are connected to each other to form a common ground line 19. The common ground line 19 extends from the change box 3 to second terminals of the left-hand loudspeaker 5A and the right-hand loudspeaker 5B via the microphone unit 4. The transmission signal line 14 and the switch line 15 extend through the change box 3, and reach the microphone unit 4.

The microphone unit 4 includes a microphone element 21 and a manually-operated switch 22. A first terminal of the microphone element 21 is connected to the transmission signal line 14. A second terminal of the microphone element 21 is connected to the common ground line 19. The switch 22 includes first and second terminals. The first and second terminals of the switch 22 are selectively connected to and disconnected from each other in accordance with actuation of a knob of the switch 22. The first terminal of the switch 22 is connected to the switch line 15. The second terminal of the switch 22 is connected to the common ground line 19.

The earphone-microphone set of FIGS. 1 and 2 operates as follows. The plug 1 is connected to the audio device while the plug 2 is connected to the portable communication terminal device. The left-hand loudspeaker 5A and the right-hand loudspeaker 5B are placed in user's left-hand ear and user's right-hand ear respectively. The portable communication terminal device can change into and out of an earphone mode of operation. During the earphone mode of operation, the portable communication terminal device can output a ring signal or a ring back tone signal which is transmitted along the reception signal line 13.

A left-channel audio signal is transmitted from the audio device to the left-hand loudspeaker 5A via the plug 1, the volume adjuster 17 in the change box 3, and the microphone unit 4. The left-channel audio signal is converted by the left-hand loudspeaker 5A into corresponding left-channel sound. The level of the left-channel sound generated by the left-hand loudspeaker 5A is controlled by the volume adjuster 17.

A right-channel audio signal is transmitted from the audio device to the right-hand loudspeaker 5B via the plug 1, the volume adjuster 18 in the change box 3, and the microphone unit 4. The right-channel audio signal is converted by the right-hand loudspeaker 5B into corresponding right-channel sound. The level of the right-channel sound generated by the right-hand loudspeaker 5B is controlled by the volume adjuster 18. The volume control of the left-channel sound from the left-hand loudspeaker 5A and the volume control of the right-channel sound from the right-hand loudspeaker 5B are linked with each other. As the dial 3a on the change box 3 is rotated in a direction toward a "RADIO CD" side, the levels of the left-channel and right-channel sounds from the left-hand and right-hand loudspeakers 5A and 5B are increased. As the dial 3a on the change box 3 is rotated in a direction away from the "RADIO CD" side, the levels of the left-channel and right-channel sounds from the left-hand and right-hand loudspeakers 5A and 5B are decreased.

When the portable communication terminal device receives an incoming call, the portable communication terminal device outputs a ring signal (a ring back tone signal) which travels along the reception signal line 13. The ring signal is transmitted from the portable communication terminal device to the left-hand and right-hand loudspeakers 5A and 5B via the plug 2, the volume adjusters 17 and 18, and the microphone unit 4. The ring signal is converted by the left-hand and right-hand loudspeakers SA and 5B into corresponding calling tones. The levels of the calling tones generated by the left-hand and right-hand loudspeakers 5A and 5B are controlled by the volume adjusters 17 and 18. As the dial 3a on the change box 3 is rotated in the direction away from the "RADIO CD" side, the levels of the calling tones from the left-hand and right-hand loudspeakers 5A and 5B are increased. As the dial 3a on the change box 3 is rotated in the direction toward the "RADIO CD" side, the levels of the calling tones from the left-hand and right-hand loudspeakers 5A and 5B are decreased.

The user can hear the calling tones among the left-channel and right-channel sounds. The level ratio (the volume ratio or the intensity ratio) between the calling tones and the left-channel and right-channel sounds can be varied by the volume adjusters 17 and 18.

When the user actuates the switch 22 in response to the calling sounds, the switch 22 generates an answer signal which travels along the switch line 15. The user may operate a key on the portable communication terminal device instead of actuating the switch 22. The answer signal is transmitted from the microphone unit 4 to the portable communication terminal device via the change box 3 and the plug 2. The portable communication terminal device takes a suitable step of implementing a terminating connection in response to the answer signal. Also, the portable communication terminal device changes to a bidirectional communication mode of operation in response to the answer signal.

During bidirectional communication, the portable communication terminal device receives a speech signal from the communication opposite party. The portable communication terminal device outputs the reception speech signal which travels along the reception signal line 13. The reception speech signal is transmitted from the portable communication terminal device to the left-hand and right-hand loudspeakers 5A and 5B via the plug 2, the volume adjusters 17 and 18 in the change box 3, and the microphone unit 4. The reception speech signal is converted by the left-hand and right-hand loudspeakers 5A and 5B into corresponding voices. The levels of the voices generated by the left-hand and right-hand loudspeakers SA and 5B are controlled by the volume adjusters 17 and 18. As the dial 3a on the change box 3 is rotated in the direction away from the "RADIO CD" side, the levels of the voices from the left-hand and right-hand loudspeakers 5A and 5B are increased. As the dial 3a on the change box 3 is rotated in the direction toward the "RADIO CD" side, the levels of the voices from the left-hand and right-hand loudspeakers 5A and 5B are decreased.

The user can hear the voices of the communication opposite party among the left-channel and right-channel sounds. The level ratio (the volume ratio or the intensity ratio) between the voices of the communication opposite party and the left-channel and right-channel sounds can be varied by the volume adjusters 17 and 18. The volume adjusters 17 and 18 are controlled by actuating the dial 3A. It is preferable that the user actuates the dial 3A to suitably set the level (the volume) of the voices of the communication opposite party relative to the left-channel and right-channel sounds when actuating the switch 22 in response to the calling sounds.

During bidirectional communication, the voice of the user is converted by the microphone element 21 into a corresponding transmission speech signal which travels along the transmission signal line 14. The transmission speech signal is sent from the microphone unit 4 to the portable communication terminal device via the change box 3 and the plug 2. Then, the transmission speech signal is sent from the portable communication terminal device to the communication opposite party.

When the user requires a call, the user actuates the switch 22 in the microphone unit 4 so that the switch 22 generates a call start signal. For example, the user continues to press the switch 22 for a given length of time, and therefore the call start signal is generated. The user may directly operate the portable communication terminal device instead of actuating the switch 22. The call start signal travels along the switch line 15. The call start signal is transmitted from the microphone unit 4 to the portable communication terminal device via the change box 3 and the plug 2. The portable communication terminal device retrieves information of a specified dial number from an internal registration memory in response to the call start signal. The portable communication terminal device transmits a call to an address (a communication opposite party) designated by the specified dial number.

Alternatively, a call may be implemented as follows. The switch 22 in the microphone unit 4 is changed between an ON state and an OFF state, and thereby a signal tone is generated by the left-hand and right-hand loudspeakers 5A and 5B. Then, the switch 22 is periodically changed between the ON state and the OFF state a given number of times or for a given length of time, and thereby a control signal is generated which designates one of memorized dial numbers. The control signal is sent from the microphone unit 4 to the portable communication terminal device via the change box 3 and the plug 2. In the portable communication terminal device, one of the memorized dial numbers is designated in response to the control signal. The portable communication terminal device transmits a call to an address (a communication opposite party) corresponding to the designated dial number.

Second Embodiment

Figure 3:
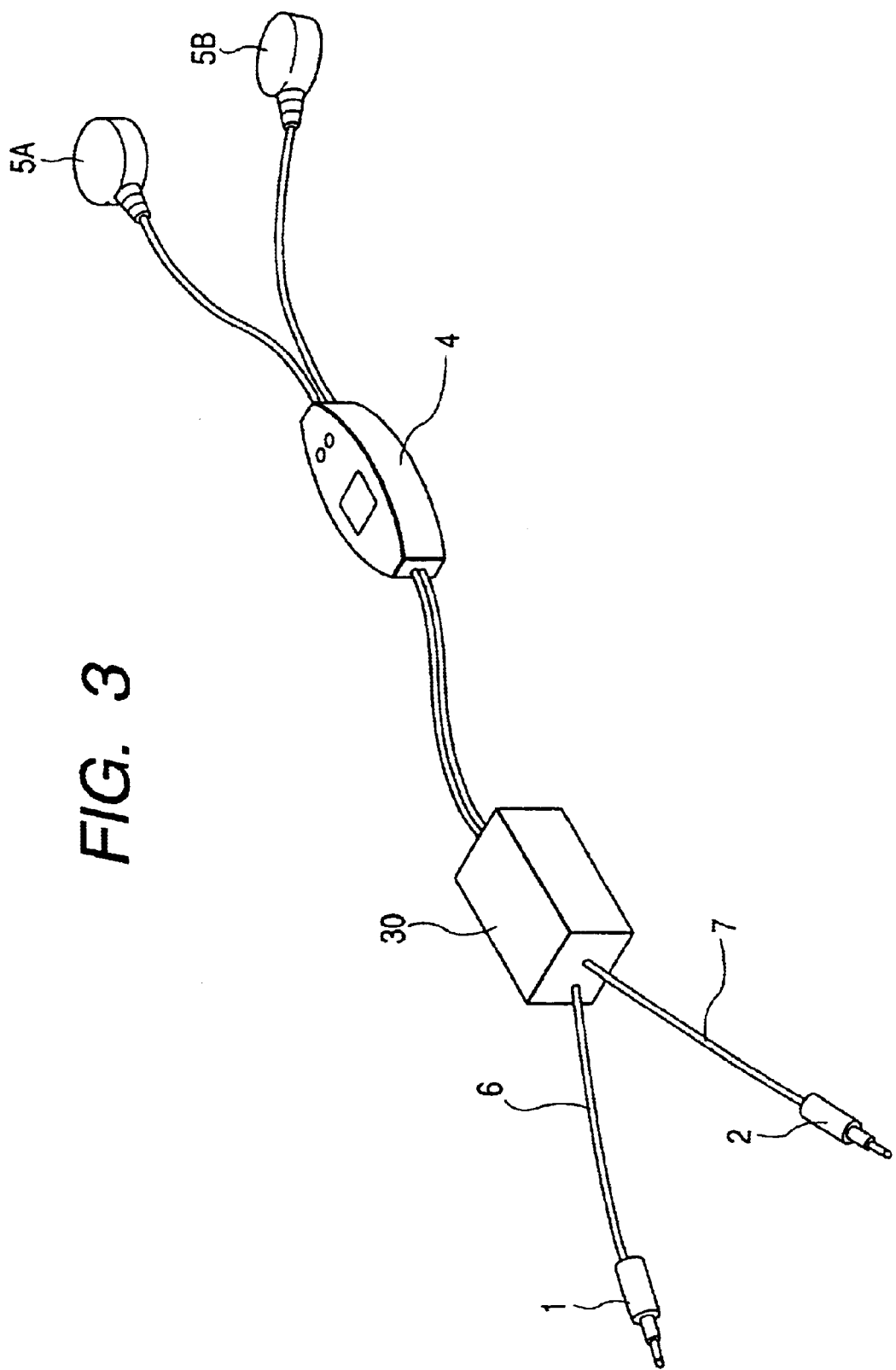
FIG. 3 is a perspective view of an earphone-microphone set according to a second embodiment of this invention.
Figure 4:
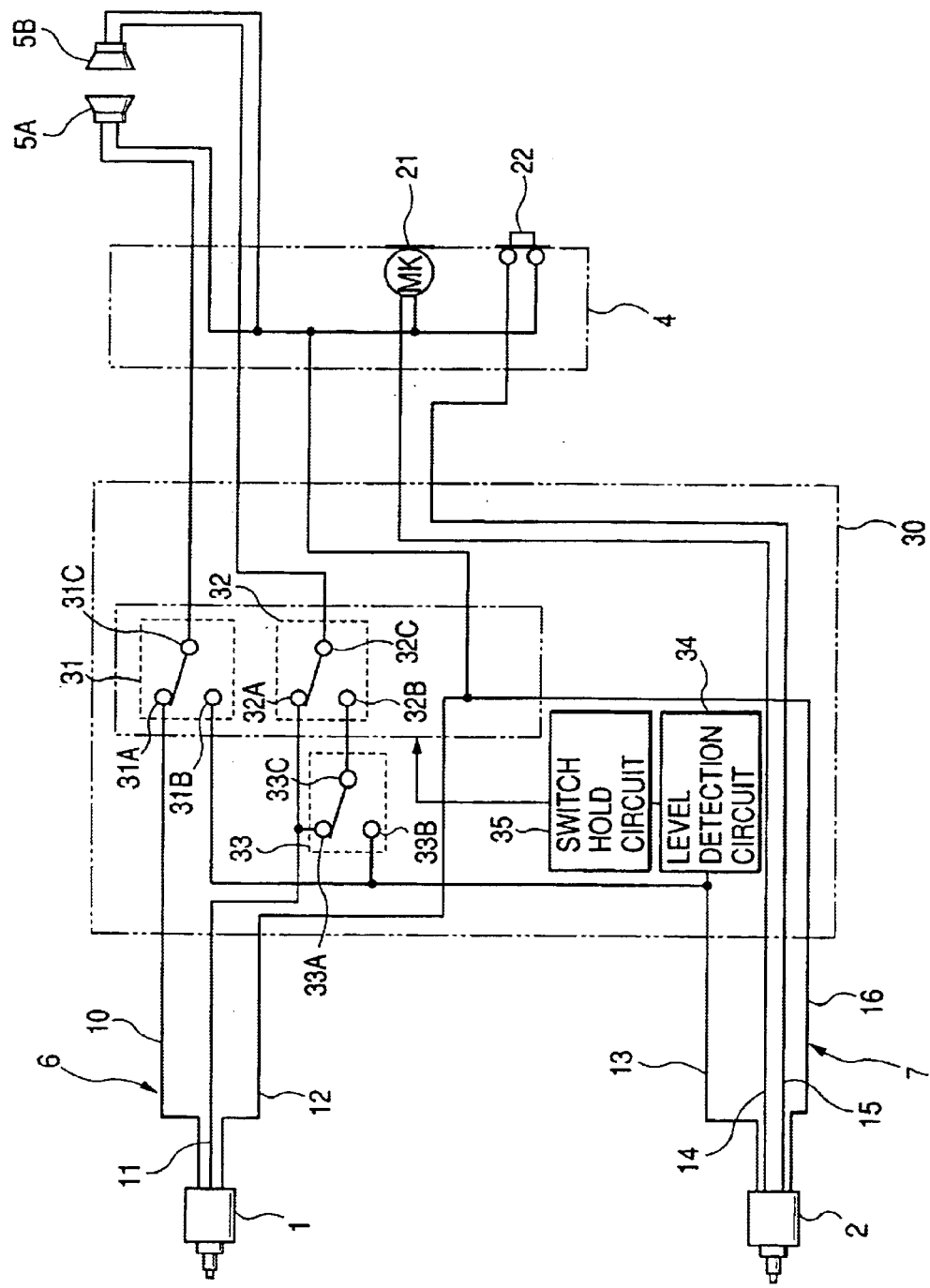
FIG. 4 is a diagram of the earphone-microphone set in FIG. 3.

FIGS. 3 and 4 show an earphone-microphone set which is similar to the earphone-microphone set of FIGS. 1 and 2 except that a change box 30 replaces the change box 3 (see FIGS. 1 and 2).

The change box 30 includes switches 31, 32, and 33, a level detection circuit 34, and a switch hold circuit 35.

The switch 31 has a first fixed contact 31A, a second fixed contact 31B, and a movable contact 31C. The movable contact 31C is connected to either the first fixed contact 31A or the second fixed contact 31B. When the movable contact 31C is connected to the first fixed contact 31A, the movable contact 31C is disconnected from the second fixed contact 31B. When the movable contact 31C is connected to the second fixed contact 31B, the movable contact 31C is disconnected from the first fixed contact 31A.

The switch 32 has a first fixed contact 32A, a second fixed contact 32B, and a movable contact 32C. The movable contact 32C is connected to either the first fixed contact 32A or the second fixed contact 32B. When the movable contact 32C is connected to the first fixed contact 32A, the movable contact 32C is disconnected from the second fixed contact 32B. When the movable contact 32C is connected to the second fixed contact 32B, the movable contact 32C is disconnected from the first fixed contact 32A.

The switches 31 and 32 are ganged. The switches 31 and 32 have a common control terminal. Each of the switches 31 and 32 is changed between two different positions in response to a binary signal applied to the common control terminal. When the movable contact 31C of the switch 31 is connected to the first fixed contact 31A thereof, the movable contact 32C of the switch 32 is connected to the first fixed contact 32A thereof. When the movable contact 31C of the switch 31 is connected to the second fixed contact 31B thereof, the movable contact 32C of the switch 32 is connected to the second fixed contact 32B thereof.

The switch 33 is of the manually-operated type. The switch 33 has a first fixed contact 33A, a second fixed contact 33B, and a movable contact 33C. The movable contact 33C is connected to either the first fixed contact 33A or the second fixed contact 33B. When the movable contact 33C is connected to the first fixed contact 33A, the movable contact 33C is disconnected from the second fixed contact 33B. When the movable contact 33C is connected to the second fixed contact 33B, the movable contact 33C is disconnected from the first fixed contact 33A.

The first fixed contact 31A of the switch 31 is connected to the left-channel line 10. The second fixed contact 31B of the switch 31 is connected to the reception signal line 13. The movable contact 31C of the switch 31 is connected to the first terminal of the left-hand loudspeaker 5A via the microphone unit 4. The first fixed contact 32A of the switch 32 is connected to the right-channel line 11. The second fixed contact 32B of the switch 32 is connected to the movable contact 33C of the switch 33. The movable contact 32C of the switch 32 is connected to the first terminal of the right-hand loudspeaker 5B via the loudspeaker unit 4. The first fixed contact 33A of the switch 33 is connected to the right-channel line 11. The second fixed contact 33B of the switch 33 is connected to the reception signal line 13. The movable contact 33C of the switch 33 leads to the second fixed contact 32B of the switch 32. The input terminal of the level detection circuit 34 is connected to the reception signal line 13. The output terminal of the level detection circuit 34 leads to the input terminal of the switch hold circuit 35. The output terminal of the switch hold circuit 35 leads to the common control terminal of the switches 31 and 32.

The level detection circuit 34 includes a level comparator which compares the level (or the amplitude) of a signal at the reception signal line 13 with a predetermined reference level (or a predetermined reference amplitude). The predetermined reference level is lower than the level of a ring signal and the level of a reception speech signal. The level detection circuit 34 outputs a binary signal to the switch hold circuit 35 which depends on whether or not the level of a signal at the reception signal line 13 is lower than the predetermined reference level. The switch hold circuit 35 outputs a binary signal to the common control terminal of the switches 31 and 32 in response to the output signal of the level detection circuit 34. Every leading edge in the output signal of the switch hold circuit 35 is substantially concurrent with the corresponding leading edge in the output signal of the level detection circuit 34. On the other hand, every trailing edge in the output signal of the switch hold circuit 35 is delayed from the corresponding trailing edge in the output signal of the level detection circuit 34 by a predetermined time length. To this end, the switch hold circuit 35 includes a pulse elongating circuit or a pulse trailing edge delay circuit.

The earphone-microphone set of FIGS. 3 and 4 operates as follows. The plug 1 is connected to the audio device while the plug 2 is connected to the portable communication terminal device. The left-hand loudspeaker 5A and the right-hand loudspeaker 5B are placed in user's left-hand ear and user's right-hand ear respectively. Normally, the switch 33 is in a position where the movable contact 33C thereof is connected to the second fixed contact 33B thereof. Normally, the switch 31 is in a position where the movable contact 31C thereof is connected to the first fixed contact 31A thereof. Similarly, the switch 32 is in a position where the movable contact 32C thereof is connected to the first fixed contact 32A thereof.

The portable communication terminal device can change into and out of an earphone mode of operation. During the earphone mode of operation, the portable communication terminal device can output a ring signal or a ring back tone signal which is transmitted along the reception signal line 13.

Under normal conditions, a left-channel audio signal is transmitted from the audio device to the left-hand loudspeaker 5A via the plug 1, the switch 31 in the change box 30, and the microphone unit 4. The left-channel audio signal is converted by the left-hand loudspeaker 5A into corresponding left-channel sound. In addition, a right-channel audio signal is transmitted from the audio device to the right-hand loudspeaker 5B via the plug 1, the switch 32 in the change box 30, and the microphone unit 4. The right-channel audio signal is converted by the right-hand loudspeaker 5B into corresponding right-channel sound.

When the portable communication terminal device receives an incoming call, the portable communication terminal device outputs a ring signal (a ring back tone signal) which travels along the reception signal line 13 via the plug 2. The ring signal is transmitted from the portable communication terminal device to the switch 31 and the level detection circuit 34 in the change box 30. Also, the ring signal is transmitted to the switch 32 in the change box 30 via the switch 33 therein. Since the ring signal has a level higher than the predetermined reference level, the ring signal is detected by the level detection circuit 34 so that the logic state of the output signal of the level detection circuit 34 changes from the normal state. The logic state of the output signal of the switch hold circuit 35 changes in response to the change in the logic state of the output signal of the level detection circuit 34. When the logic state of the output signal of the switch hold circuit 35 changes, the position of the switch 31 changes so that the movable contact 31C of the switch 31 is disconnected from the first fixed contact 31A thereof and is connected to the second fixed contact 31B thereof. In addition, the position of the switch 32 changes so that the movable contact 32C of the switch 32 is disconnected from the first fixed contact 32A thereof and is connected to the second fixed contact 32B thereof. As a result, the ring signal travels through the switches 31 and 32. On the other hand, the left-channel audio signal and the right-channel audio signal are blocked by the switches 31 and 32 respectively. The ring signal is sent from the change box 30 to the left-hand and right-hand loudspeakers 5A and 5B via the microphone unit 4. The ring signal is converted by the left-hand and right-hand loudspeakers 5A and 5B into corresponding calling tones.

When the user actuates the switch 22 in response to the calling sounds, the switch 22 generates an answer signal which travels along the switch line 15. The user may operate a key on the portable communication terminal device instead of actuating the switch 22. The answer signal is transmitted from the microphone unit 4 to the portable communication terminal device via the change box 30 and the plug 2. The portable communication terminal device takes a suitable step of implementing a terminating connection in response to the answer signal. Also, the portable communication terminal device changes to a bidirectional communication mode of operation in response to the answer signal.

During bidirectional communication, the portable communication terminal device receives a speech signal from the communication opposite party. The portable communication terminal device outputs the reception speech signal which travels along the reception signal line 13 via the plug 2. The reception speech signal is transmitted from the portable communication terminal device to the left-hand and right-hand loudspeakers 5A and 5B via the plug 2, the switches 31, 32, and 33 in the change box 30, and the microphone unit 4. The reception speech signal is converted by the left-hand and right-hand loudspeakers 5A and 5B into corresponding voices. In addition, the reception speech signal is transmitted from the portable communication terminal device to the level detection circuit 34 in the change box 30.

During bidirectional communication, the voice of the user is converted by the microphone element 21 into a corresponding transmission speech signal which travels along the transmission signal line 14. The transmission speech signal is sent from the microphone unit 4 to the portable communication terminal device via the change box 3 and the plug 2. Then, the transmission speech signal is sent from the portable communication terminal device to the communication opposite party.

During bidirectional communication, the level of a signal at the reception signal line 13, that is, the level of the reception speech signal, is monitored by the level detection circuit 34. Since the level of the reception speech signal is higher than the predetermined reference level, the level detection circuit 34 and the switch hold circuit 35 cooperate to keep the switches 31 and 32 in the positions allowing the transmission of the reception speech signal toward the left-hand and right-hand loudspeakers 5A and 5B as long as the reception speech signal is present. In cases where the level of the signal at the reception signal line 13 drops below the predetermined reference level and then continues to be lower than the predetermined reference level during the predetermined time length or shorter, the output signal of the switch hold circuit 35 remains unchanged so that the switches 31 and 32 remain in the positions allowing the transmission of the reception speech signal toward the left-hand and right-hand loudspeakers 5A and 5B. In cases where the level at the reception signal line 13 drops below the predetermined reference level and then continues to be lower than the predetermined reference level during longer than the predetermined time length, the output signal of the switch hold circuit 35 returns to the normal logic state so that the switches 31 and 32 change to the positions allowing the transmission of the left-channel and right-channel audio signals toward the left-hand and right-hand loudspeakers 5A and 5B. When the reception speech signal appears again so that the level of the signal at the reception signal line 13 exceeds the predetermined reference level, the level detection circuit 34 and the switch hold circuit 35 cooperate to change the switches 31 and 32 to the positions allowing the transmission of the reception speech signal toward the left-hand and right-hand loudspeakers 5A and 5B.

When bidirectional communication ends and the user actuates the switch 22 in the microphone unit 4 to implement disconnection, the switch 22 generates an ending signal which travels along the switch line 15. The ending signal is transmitted from the microphone unit 4 to the portable communication terminal device via the change box 30 and the plug 2. The portable communication terminal device takes a suitable step of implementing disconnection. As a result, the reception speed signal disappears. Thus, the level of the signal at the reception signal line 13 is continuously lower than the predetermined reference level so that the output signal of the switch hold circuit 35 returns to the normal logic state. When the output signal of the switch hold circuit 35 returns to the normal logic state, the switches 31 and 32 return to the normal positions where the left-channel and right-channel audio signals are transmitted to the left-hand and right-hand loudspeakers 5A and 5B.

In the case where the movable contact 33C of the the switch 33 is connected to the first fixed contact 33A thereof, the right-channel audio signal remains transmitted to the right-hand loudspeaker 5B even when a ring signal or a reception speech signal is detected by the level detection circuit 34. Accordingly, in this case, the user can hear a calling tone or a transmitted voice via the left-channel loudspeaker 5A while listening to the right-channel sound via the right-channel loudspeaker 5B.

Third Embodiment

Figure 5:
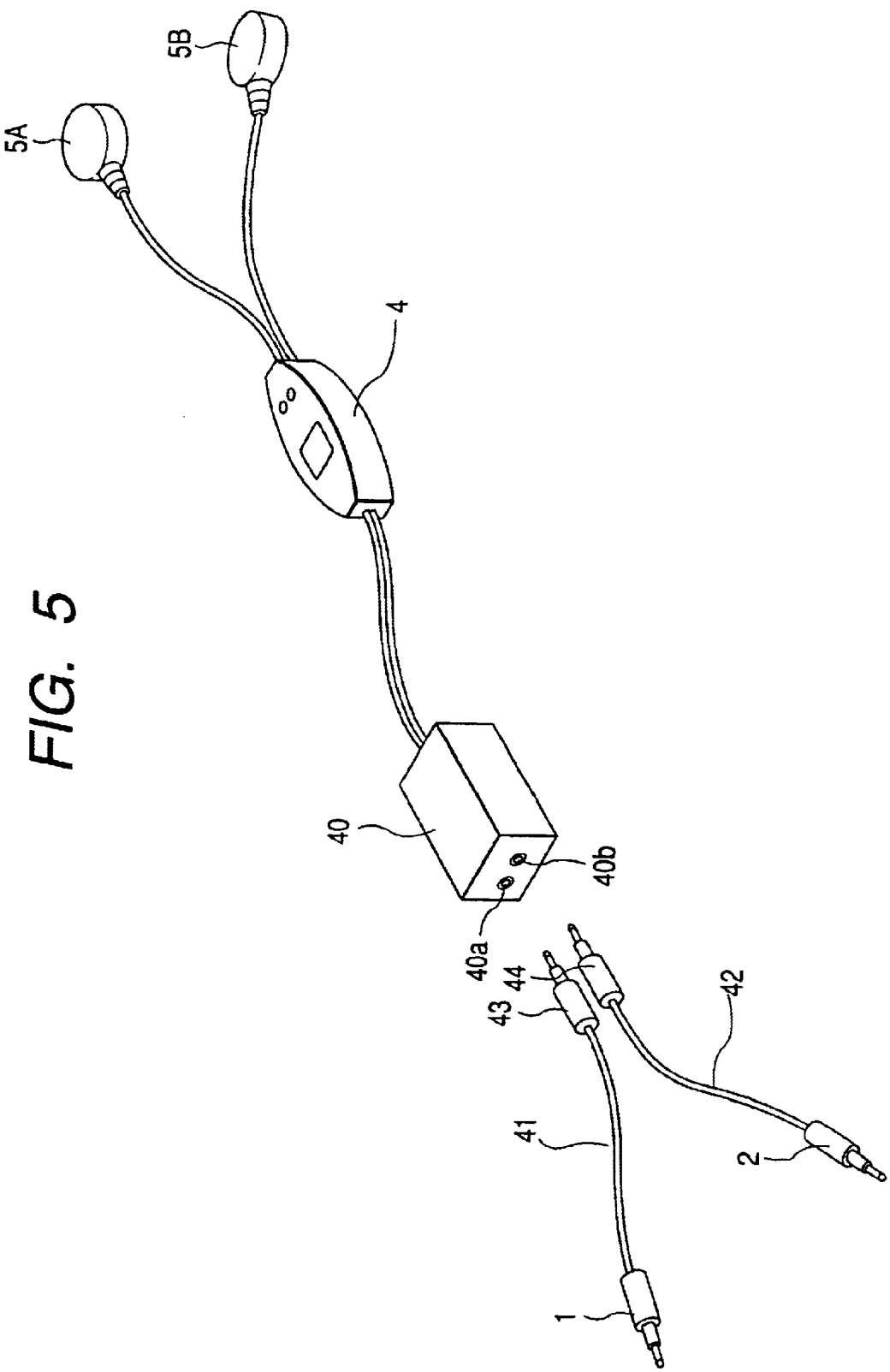
FIG. 5 is a perspective view of an earphone-microphone set according to a third embodiment of this invention.

FIG. 5 shows an earphone-microphone set which is similar to the earphone-microphone set of FIGS. 1 and 2 or the earphone-microphone set of FIGS. 3 and 4 except for design changes explained hereinafter.

The earphone-microphone set in FIG. 5 includes a change box 40 instead of the change box 3 in FIGS. 1 and 2 or the change box 30 in FIGS. 3 and 4. The change box 40 has jacks 40a and 40b for receiving plugs 43 and 44 respectively. The change box 40 is similar in internal structure to the change box 3 in FIGS. 1 and 2 or the change box 30 in FIGS. 3 and 4.

A cable 41 containing the left-channel line 10, the right-channel line 11, and the ground line 12 (see FIGS. 2 and 4) extends between the plugs 1 and 43. A cable 42 containing the reception signal line 13, the transmission signal line 14, the switch line 15, and the ground line 16 (see FIGS. 2 and 4) extends between the plugs 2 and 44.

The plug 43 can be inserted into the Jack 40a to provide connection with the Jack 40a. The plug 43 can be removed from the jack 40a to disconnect from the jack 40a. The plug 44 can be inserted into the Jack 40b to provide connection with the Jack 40b. The plug 44 can be removed from the jack 40b to disconnect from the jack 40b.

The left-channel line 10, the right-channel line 11, and the ground line 12 (see FIGS. 2 and 4) in the cable 41 are connected with the change box 40 when the plug 43 is inserted into the jack 40a. The reception signal line 13, the transmission signal line 14, the switch line 15, and the ground line 16 (see FIGS. 2 and 4) in the cable 42 are connected with the change box 40 .when the plug 44 is inserted into the jack 40b.

Fourth Embodiment

Figure 6:
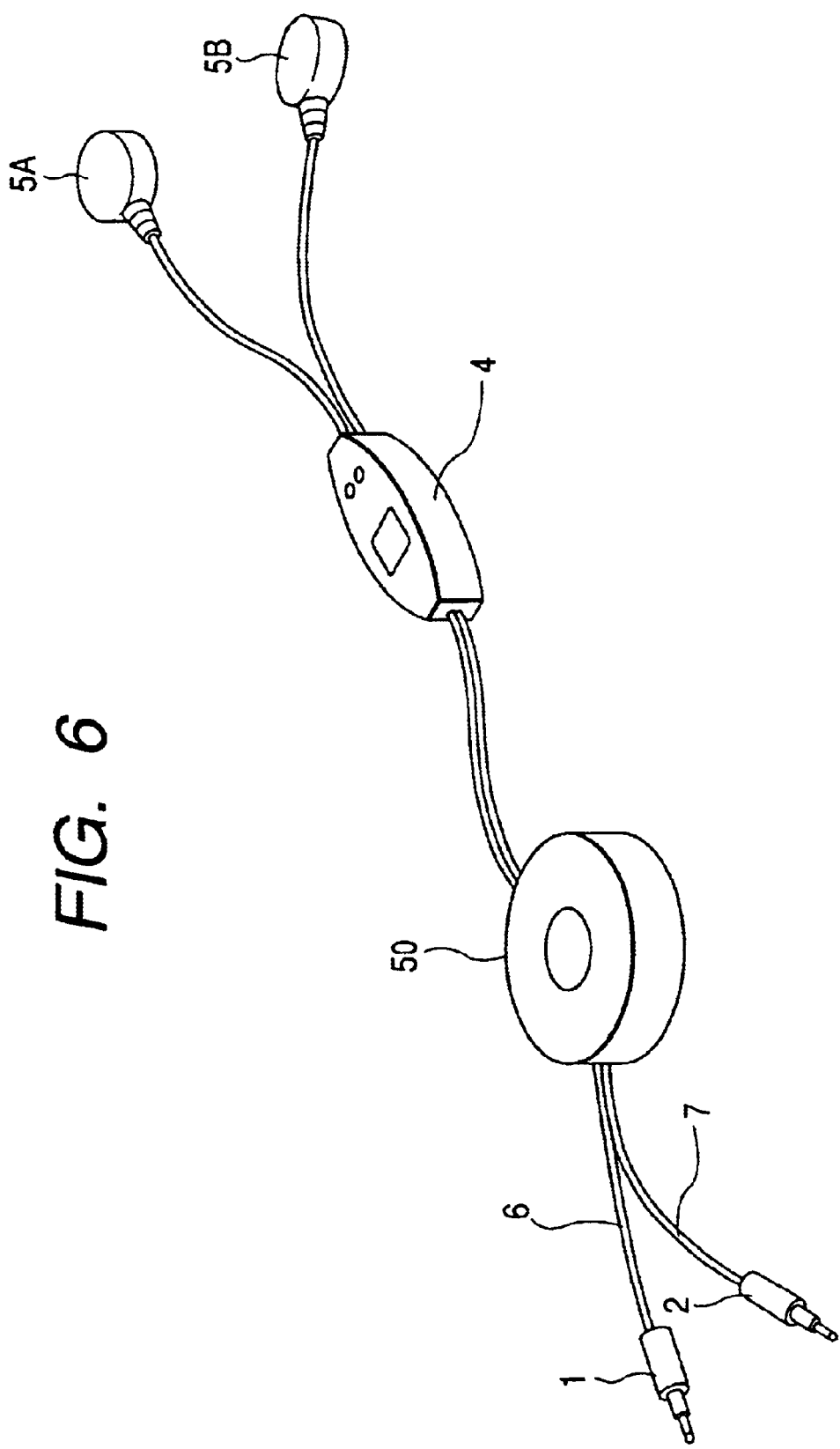
FIG. 6 is a perspective view of an earphone-microphone set according to a fourth embodiment of this invention.

FIG. 6 shows an earphone-microphone set which is similar to the earphone-microphone set of FIGS. 1 and 2 or the earphone-microphone set of FIGS. 3 and 4 except for design changes explained hereinafter.

The earphone-microphone set In FIG. 6 includes a change box 50 instead of the change box 3 in FIGS. 1 and 2 or the change box 30 in FIGS. 3 and 4. The body of the change box 50 has a casing and a rotatable reel supported within the casing. The cables 6 and 7 extend into the casing of the change box 50 via an aperture through the casing. Ends of the cables 6 and 7 are connected to the reel in the casing of the change box 50. The cables 6 and 7 can be wound on the reel in the casing of the change box 50. Accordingly, the lengths of the cables 6 and 7 extending outward of the change box 50 can be varied.

Two independent reels may be provided in the change box 50 for the cables 6 and 7 respectively. In this case, the cables 6 and 7 can be independently wound on the respective reels.

Other Embodiments

The earphone-microphone set in FIGS. 3 and 4 may be modified to additionally include volume adjusters similar to the volume adjusters 17 and 18 in FIG. 2.

The microphone element 21 and at least one of the left-hand loudspeaker 5A and the right-hand loudspeaker 5B may be in a single unit. In this case, the microphone element 21 is preferably of the bone vibration type.

One of the left-hand and right-hand loudspeakers 5A and 5B may be omitted.

The left-hand and right-hand loudspeakers 5A and 5B may be provided in a headphone or a headset.

The left-hand and right-hand loudspeakers 5A and 5B may be inner earphones.

What is claimed is:

1. An earphone apparatus for an audio device and a portable communication terminal device, comprising:

a first plug for disconnectable connection with the audio device;

a second plug for disconnectable connection with the portable communication terminal device;

an electroacoustical transducer;

first means connected to the second plug for detecting a level of an electric speech signal outputted from the portable communication terminal device;

second means connected to the first plug, the second plug, the electroacoustical transducer, and the first means for automatically disconnecting the first plug from the electroacoustical transducer and automatically connecting the second plug to the electroacoustical transducer when the level detected by the first means is equal to or higher than a predetermined reference level;

third means connected to the first plug, the second plug, the electroacoustical transducer, and the first means for automatically disconnecting the second plug from the electroacoustical transducer and automatically connecting the first plug to the electroacoustical transducer in cases where the level detected by the first means drops below the predetermined reference level and then remains lower than the predetermined reference level for a duration longer than a predetermined time length; and fourth means connected to the first plug, the second plug, the electroacoustical transducer, and the first means for holding the first plug disconnected from the electroacoustical transducer and holding the second plug connected to the electroacoustical transducer in cases where the level detected by the first means drops below the predetermined reference level and then remains lower than the predetermined reference level during the predetermined time length or shorter.

2. An earphone apparatus as recited in claim 1, further comprising a microphone element connected to the second plug, and a switch connected to the second plug for generating a control signal transmitted to the portable communication terminal device.

3. An earphone apparatus for an audio device and a portable communication terminal device, comprising:

a first plug for disconnectable connection with the audio device;

a second plug for disconnectable connection with the portable communication terminal device;

a first electroacoustical transducer;

a second electroacoustical transducer;

first means connected to the second plug for detecting whether or not a call-related electric signal is outputted from the portable communication terminal device;

second means connected to the first plug, the second plug, the first electroacoustical transducer and the first means, for automatically disconnecting the first plug from the first electroacoustical transducer, and automatically connecting the second plug to the first electroacoustical transducer in response to the detection result signal generated by the first means when the first means detects that a call-related electric signal is outputted from the portable communication terminal device; and third means connected to the first plug, the second electroacoustical transducer and the first means, for automatically connecting the disconnected first plug to the second electroacoustical transducer.

* * * * *